United States Patent [19]

Broadt et al.

[11] 4,325,104
[45] Apr. 13, 1982

[54] MULTILAMP PHOTOFLASH UNIT WITH FUNCTIONAL LABEL

[75] Inventors: David R. Broadt, Lewisburg, Pa.; Emergy G. Audesse, Beverly, Mass.

[73] Assignee: GTE Products Corporation, Stamford, Conn.

[21] Appl. No.: 181,932

[22] Filed: Aug. 27, 1980

[51] Int. Cl.³ .............................................. G03B 15/02
[52] U.S. Cl. ........................................ 362/11; 362/15; 362/16
[58] Field of Search ...................... 362/3, 5, 11, 13, 14, 362/15, 16, 17, 185, 189, 196, 198, 200, 213, 240, 278, 310, 320, 351, 303; 206/418, 419, 420, 476; 53/559; 354/143; 431/359

[56] References Cited

U.S. PATENT DOCUMENTS

| | | | |
|---|---|---|---|
| 2,818,169 | 12/1957 | Bergstedt | 428/12 |
| 3,454,756 | 7/1969 | Iwata et al. | 362/13 |
| 3,473,880 | 10/1969 | Wick | 362/13 |
| 3,512,332 | 5/1970 | Klein | 53/559 |
| 3,718,815 | 2/1973 | McDonough et al. | 362/5 |
| 3,857,667 | 12/1974 | Vetere et al. | 362/11 |
| 3,920,371 | 11/1975 | Faller | 53/559 |
| 4,104,705 | 8/1978 | Levand, Jr. et al. | 362/13 |
| 4,136,379 | 1/1979 | Chevali | 362/17 |

Primary Examiner—Donald P. Walsh
Attorney, Agent, or Firm—Edward J. Coleman

[57] ABSTRACT

A photoflash unit comprising a horizontal linear array of flashlamps enclosed within a one-piece housing member having a light-transmitting front portion folded-over a back portion containing a plurality of lamp-receiving cavities in which respective lamps are disposed. The housing is a formed sheet of plastic film having a linear fold disposed horizontally along the top of the array of cavities, which are aluminized to provide a reflective coating on the cavity surfaces. A pair of lead-in wires from each of the lamps are connected to conductive circuit patterns on one side of a printed circuit board sandwiched between a set of tabs which run along the bottom of the front and back portions of the housing. The bottom periphery of the housing is secured together by means of a plurality of staples having legs which extend through the front and back tabs of the circuit board and are clinched onto the exterior surface of the front tab. The front portion of the housing includes a window area which lies in a plane offset from the front tab and joined thereto by a web. A label comprising an adhesive-backed sheet of substantially opaque material is affixed to the front portion of the housing and disposed to cover both the staples and the web, the web covering providing selective shielding of light radiated from flashing lamps. The back of the label can be reflective for redirecting shielded light toward the reflective cavities behind the lamps for subsequent redirection as usable light.

15 Claims, 5 Drawing Figures

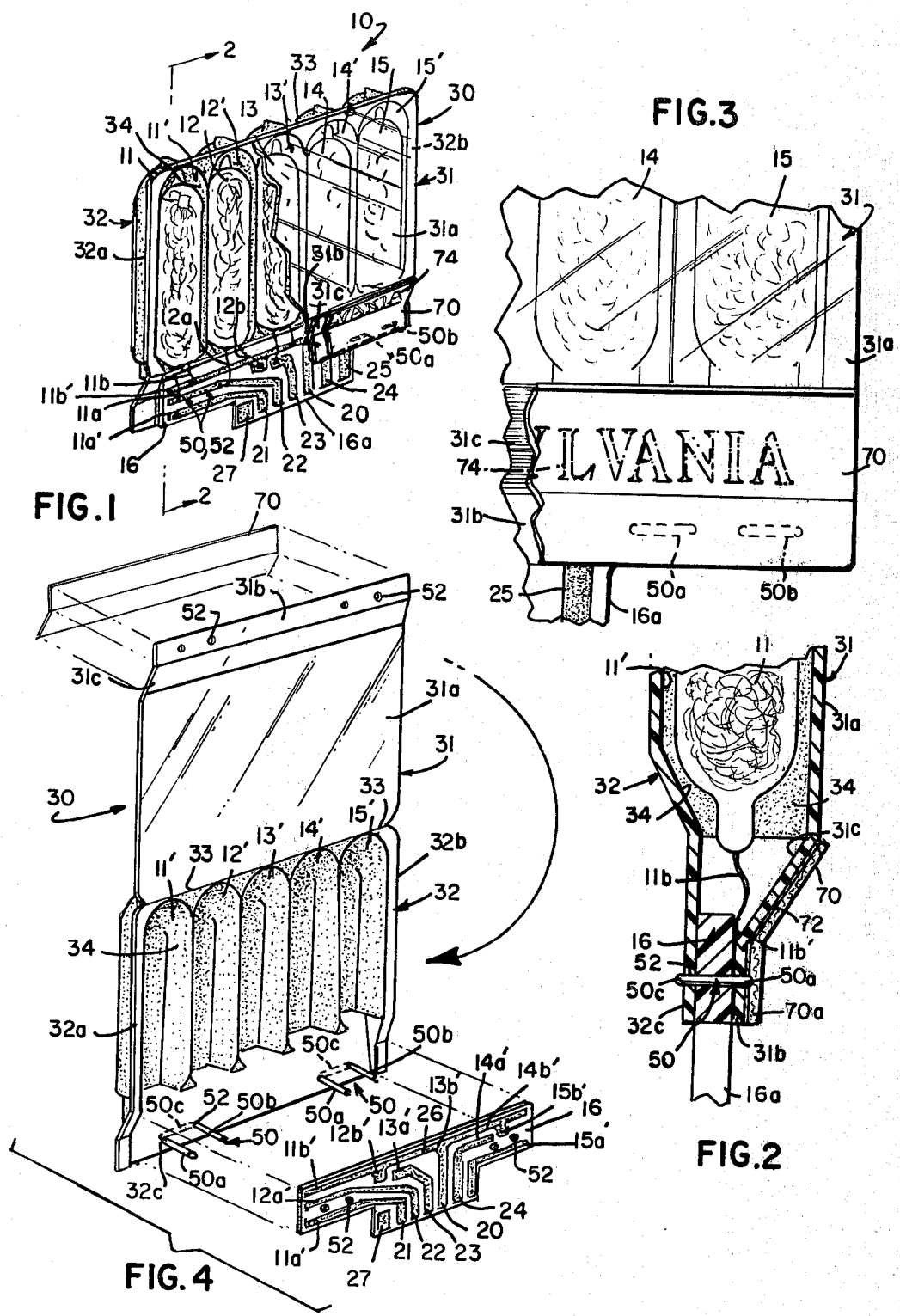

MULTILAMP PHOTOFLASH UNIT WITH FUNCTIONAL LABEL

BACKGROUND OF THE INVENTION

This invention relates to multilamp photoflash units and, in particular, to a more compact, cost-efficient array of photoflash lamps having a labeled housing construction.

Heretofore, multilamp photoflash units, of either the cube or array configurations, have comprised housing sections joined together by means of heat or sonic sealing techniques. For example, in the case of the flashcube, such as described in U.S. Pat. No. 3,327,105, the magicube, such as described in U.S. Pat. No. 3,730,669, and the flash bar, such as described in U.S. Pat. No. 3,857,667, a plurality of lamps and associated reflectors are mounted on a relatively horizontal base member and enclosed in a cubical or rectangular parallelopided-shaped transparent cover section which is joined to the periphery of the base section. The labeling for these units has comprised an indicia sheet insert located within the transparent cover above the lamps. In addition to serving as identification means, the labels were also adapted to function as flash indicators by including heat-shrinkable thermoplastic or foil over openings in alignment with respective lamps. For example, see German Auslegeschrift No. 1942465, published Oct. 2, 1977. Upon flashing of a lamp, the heat radiated therefrom causes the colored, (e.g., blue) plastic film to shrink away and disappear from the respective indicia sheet aperture to leave a void or dark spot identifying the lamp as having been flashed. Application of this approach to an indicia sheet located inside the transparent back of a planar array of lamps that is commercially available and referred to as a flipflash is described in U.S. Pat. No. 3,894,226. The overall construction of the flipflash unit comprises front and back plastic housing members with interlocking means for providing a unitary structure. The front housing member is a rectangular concavity, and the back housing is substantially flat. Sandwiched between the front and back housing members in the order named are a plurality of flashlamps, a multi-cavity reflector member, an insulating sheet, a printed circuit board having conductive patterns on one side to which the lamps are connected, and the indicia sheet. A similar planar array in which additional lamps are packaged in the same volume is described in U.S. Pat. No. 4,164,007.

In a unidirectional linear photoflash array described in U.S. Pat. No. 3,473,880 of Wick, the lamps are connected to a printed circuit board which comprises the rear housing of the unit and includes reflector cavities. A separate transparent sheet is then secured, such as by glue, to the front of the unit to enclose the lamps. Circuit patterns and terminals are disposed on both sides of the rear housing member. The patent does not appear to disclose any labeling with respect to the flash unit itself. U.S. Pat. No. 3,430,545 of Wick appears to illustrate a somewhat similar type of photoflash unit housing structure.

In a copending application Ser. No. 181,936, filed concurrently herewith and assigned to the same assignee, a compact, cost-efficient photoflash unit is described in which a horizontal linear array of flashlamps is enclosed within a one-piece housing member having a light-transmitting front portion folded over a back portion containing a plurality of lamp-receiving cavities in which the respective lamps are disposed. The housing is a formed sheet of plastic film having a linear fold disposed horizontally along the top of the array of cavities, which are selectively aluminized to provide a reflective coating on the cavity surfaces. A pair of lead-in wires for each of the lamps are connected to conductive circuit patterns on one side of a printed circuit board sandwiched between a set of tabs which run along the bottom of the front and back portions of the housing and are secured together. The sides of the housing are also secured so that the lamps, lead-in wires and connections are disposed within a secured enclosure, with a plurality of conductive connector terminals being disposed on a tab which projects from the printed circuit board and extends exteriorly of the secured enclosure. In this very compact enclosure configuration, the front portion of the housing includes a transparent window area that lies within a plane offset from the front housing tab and joined thereto by a transparent web. A means for securing the bottom portion of the housing is described in copending application Ser. No. 181,938, filed concurrently herewith and assigned to the same assignee, wherein one or more staples are disposed along the housing tabs. The staples extend through both tabs and the printed circuit board and are clinched onto the exterior surface of one of the tabs.

It is a purpose of the present invention to provide means for both labeling a photoflash unit and providing selective shielding of light radiated from flashing lamps through the transparent front portion of the unit housing. Such shielding may be desired in certain applications so as not to interfer with camera photocell operation; e.g., camera apparatus with exposure control systems including a photocell are described in U.S. Pat. Nos. 4,017,873 and 4,023,187. In the case of the aforementioned unit employing staple closure of the housing, a further purpose of the invention is to provide means for isolating the clinched ends of the staples to prevent contact with the hand of a person holding the array. Yet a further purpose of the invention is to enhance the usable light available from a compact photoflash unit.

SUMMARY OF THE INVENTION

Accordingly, it is an object of the present invention to provide an improved multilamp photoflash unit having a functional label which avoids interference with unit performance and enhances the outward appearance thereof.

A principal object of the invention is to provide an attractively labeled multilamp photoflash unit having a simplified, more cost-efficient construction which is comparatively simple, easy to manufacture and includes means for precluding radiation of light therefrom in undesired directions.

A further object is to provide a multilamp array employing stapled closure for enhanced structural integrity and which includes means for protectively isolating the clinched ends of the staples.

Yet another object is to provide a photoflash unit having means for enhancing the usable light output available.

These and other objects, advantages and features are attained in a multilamp photoflash unit including a housing means having a light-transmitting front portion, a plurality of flashlamps enclosed in the housing means, and terminal means joined to the housing means and coupled to the lamps for enabling flashing of the lamps in response to flash actuation signals applied thereto. A label comprising an adhesive-backed sheet of substantially opaque material is affixed to the exterior of the housing means and disposed to cover a section of the light-transmitting front portion of the housing for providing selective shielding of the light radiated from flashing lamps therein. Enhanced usable light is obtained, when the unit housing includes a reflective coating behind the lamps, by providing a reflective surface on the side of the label which is affixed to the housing and thereby faces the lamps. In this manner, the shielded light is redirected toward the reflective surfaces behind the lamps for subsequent redirection as usable light.

According to one embodiment, the front portion of the housing is secured to a remainder portion thereof at peripheral areas by means of one or more staples. Each of the staples has a pair of legs extending through both of the housing portions and a center region bearing against a surface of the remainder portion of the housing. The legs are clinched onto an external surface of the front portion of the housing, and the aforementioned label is affixed to the housing to also cover the peripheral areas thereof and the clinched staple legs. In a variation of this functional label application, the sheet of label material further includes a layer of indentable padding, whereby the portions of the label covering the clinched staple legs have a substantially smooth external surface.

In a particularly useful embodiment, the housing means comprises a one-piece housing member having a light-transmitting front portion folded over a back portion containing a plurality of lamp-receiving cavities, and each of the flashlamps is disposed in a respective one of the cavities and enclosed by the folded over housing member. The terminal means for the unit comprises a printed circuit board having electrically conductive circuit patterns disposed on the surface thereof which include a plurality of terminal areas at one side edge of the board that are selectively interconnected with a plurality of lamp contact areas. Each of the lamps has a pair of lead-in wires secured in electrical connection with respective ones of the lamp contact areas, and the side edge of the circuit board having the terminal areas extending below the folded over housing member. Further, the back portion of the housing includes a first tab means which extendss below the lamp-receiving cavities, and the front portion of the housing includes a window area adjacent the lamps and a second tab means which extends below the window area. When the first and second tab means at the bottom of the folded over housing are secured together by staples, a portion of the circuit board is sandwiched between and also secured by the staples to the first and second tab means. The uncovered section of the window area and the second tab means are disposed in substantially parallel planes offset from one another and joined together by a web. In this embodiment, the functional label is disposed to cover substantially the entire exterior surface of the otherwise transparent web and also the exterior surface of the second tab means. In this manner, in addition to functioning as an identification means, or the like, the label also functions to shield the light from the unit that would otherwise radiate in a significantly downward direction, and the label protectively covers the clinched staple legs to isolate them from the hand of a person holding the array. If the cavities behind the lamps are provided with a reflective coating, the back of the label may be provided with a reflective surface for redirecting the web-shielded light toward the reflective surfaces of the lamp-receiving cavities for subsequent redirection as usable light.

BRIEF DESCRIPTION OF THE DRAWINGS

This invention will be more fully described hereinafter in conjunction with the accompanying drawings, in which:

FIG. 1 is a perspective view of one embodiment of a multilamp photoflash unit in accordance with the invention, the unit being shown partly broken away in section to more clearly illustrate the construction thereof;

FIG. 2 is an enlarged fragmentary cross-sectional view of the unit of FIG. 1 taken on line 2—2 thereof;

FIG. 3 is a fragmentary elevation of the lower right front portion of the unit of FIG. 1;

FIG. 4 is a perspective view, in unfolded form, of the one-piece housing of the unit of FIG. 1 in exploded relation to the functional label and the associated printed circuit board, without showing the attached lamps.

DESCRIPTION OF PREFERRED EMBODIMENTS

Figure 5:
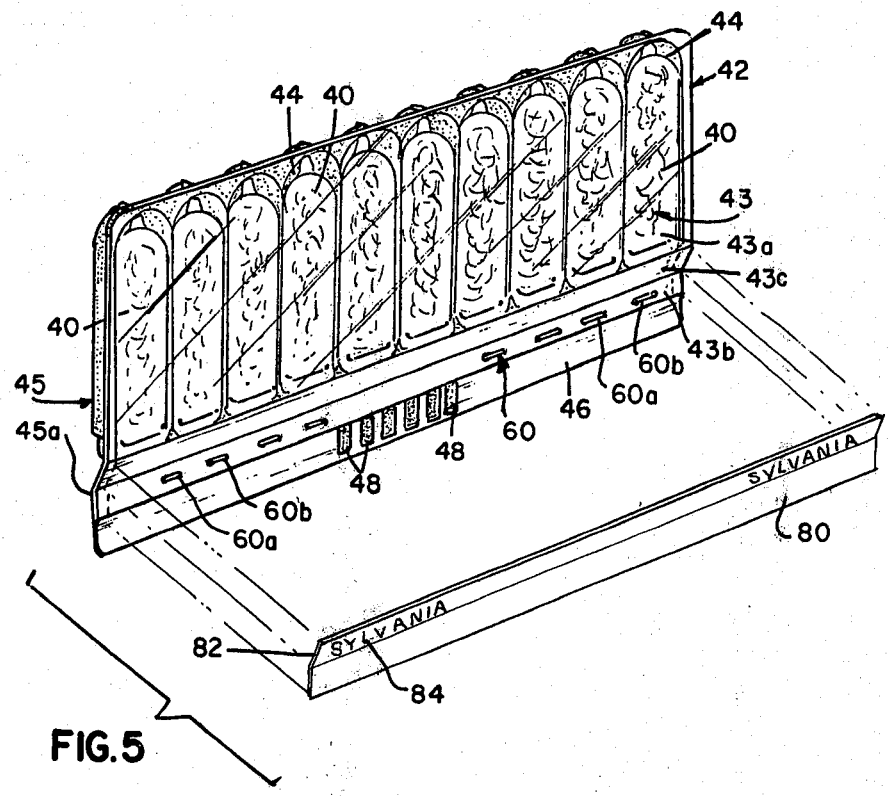
FIG. 5 is a perspective view of another embodiment of a multilamp photoflash unit with an associated functional label shown in exploded relation thereto.

FIGS. 1–3 illustrate one embodiment of a multilamp photoflash unit 10 comprising a horizontal array of five flash lamps 11–15 mounted on a printed circuit board 16. Each of the lamps has a pair of lead-in wires 11a, 11b, etc., connected to the printed circuitry on the board 16. For example, the lead-in wires 11a, 11b, etc., may be soldered to respective lamp contact areas 11a', 11b', etc., forming portions of conductive circuit patterns on the circuit board 16 (see FIG. 4). Each of the lamps 11, etc., has a tubular light-transmitting glass envelope having a press seal at one end through which the lead-in wires emerge, and a tip-off at the other end. The exterior of the envelope is coated with a transparent protective material, such as cellulose acetate lacquer, and the interior is filled with a quantity of filamentary combustible material, such as shredded zirconium, and a combustion supporting gas, such as oxygen. The ignition means within the lamp envelope may comprise, in the case of a low voltage source, a filament connected across the inner ends of the lead-in wires and the filament.

When the flashlamps are mounted and positioned on the circuit board 16, the lead-in wires 11a, 11b, etc., are bent, as illustrated, so that at all of the tubular envelopes of the lamps are positioned with the longitudinal axes thereof lying in a plane which is offset from but substantially parallel to the surface of the printed circuit board 16 and arranged in a horizontal array, as illustrated.

Referring also to FIG. 4, the circuit board 16 has a "printed circuit" thereon for enabling selective flashing of the lamps in response to flash actuation signals in the form of applied firing voltage pulses. In the particular embodiment illustrated in FIGS. 1–4, the entire printed circuit is provided on the same one side of the circuit board, namely, the obverse side of the board to which the flashlamp lead-in wires are connected. The substrate of circuit board 16 comprises an insulating material, such as XP phenolic, and the pattern of electrically conductive circuit runs is provided on the board surface by means such as silk screening, chemical etching, etc.

According to a preferred embodiment, however, the circuit patterns are formed of die-stamped copper, thereby providing significant cost advantages. For example, U.S. Pat. No. 3,990,142 describes a die-stamped printed circuit board, and copending applicators Ser. Nos. 131,614 and 131,711, both filed Mar. 19, 1980 and assigned to the present assignee, describe die-stamped circuit boards for photoflash devices.

The circuit board 16 has a substantially rectangular shape with a projecting tab 16a which is significantly narrower than the long lower side of the circuit board from which the tab projects. Located adjacent to one another on the tab are a plurality of terminal areas 20–25 at one side edge thereof which are selectively interconnected via conductor runs with a plurality of lamp contact areas 11a', 11b' through 15a', 15b'. More specifically, the terminal 20 forms part of and is connected to a common circuit conductor run 26 which is connected electrically to one lead-in wire of each of the flashlamps at lamp contact areas 11b'–15b', respectively. The terminals 21–25 are each directly connected to a respective one of the non-common lead-in wires of a respective one of the lamps. That is, selective terminal 21 is directly connected to the lamp contact area 11a'; selective terminal 22 is directly connected to lamp contact area 12a'; selective terminal 23 is directly connected to lamp contact area 13a'; selective terminal 24 is directly connected to lamp contact area 14a'; and the selective terminal 25 is directly connected to lamp contact areas 15a'.

The common terminal 20 and the five selective terminals 21–25 on tab 16a are adapted for engagement with the socket contacts of a source of lamp firing pulses. For example, the source of firing pulses for connection to these terminals may comprise an electronic circuit such as that described in U.S. Pat. No. 3,618,492, which may be incorporated in a camera or a flash attachment for use with the camera and adapted to generate low voltage pulses in synchronization with the actuation of a camera shutter mechanism. Also shown on tab 16a is a conductive strip 27 for briding camera socket contacts to convert the camera to a flash mode of operation, as described in U.S. Pat. No. 3,757,643.

As described in a copending application Ser. No. 181,936, filed concurrently herewith and assigned to the same assignee, the lamp assembly and a portion of the circuit board are enclosed in a comparatively simple and compact housing construction of a cost-efficient and universal design. More specifically, the unit enclosure comprises a one-piece housing member 30 having a light-transmitting front portion 31 folded over a back portion 32 containing a plurality of, in this case five, lamp-receiving cavities 11'–15'. Preferably, the housing member comprises a formed sheet of plastic film, such as cellulose propionate having a thickness of about 30 mils, prepared by injection molding, thermoforming of plastic sheet or film, or any other suitable means. As best shown in the unfolded illustration of FIG. 4, the housing member contains a linear fold 33 which separate the front and back portions, and when the housing is folded over, this linear fold 33 is disposed horizontally along the top of the horizontal array of lamp-receiving cavities 11'–15'.

In order to facilitate securing of the housing once it is folded over, the back portion 32 is provided with side flanges 32a and 32b, which extend on each side of the array of cavities, and an elongated tab 32c (FIG. 4) which extends below the array of cavities. The front portion 31 of the housing includes a transparent window area 31a, which is uncovered and substantially planar, and an elongated tab 31b which extends below the window area and is disposed in a plane which is substantially parallel to but offset from the plane of the uncovered window area. The front portion 31 further includes a web 31c which joins window area 31a with the tab 31b.

In assembly of the unit, the lead-in wires of the flashlamps are soldered to the appropriate lamp contact areas on the printed circuit board 16, and then the circuit is aligned against tab 32c of the housing, with each of the lamps 11–15 disposed in a respective one of the cavities 11'–15'. The front portion of the housing is then folded over, with the circuit board 16 sandwiched between tabs 31b and 32c and the window area 31a enclosing the lamps in their respective cavities. In this manner, the window area is essentially adjacent to the lamps and the top and side peripheries of the lamp receiving cavities are substantially in abutment with the window area of the folded over front portion so that individual chambers enclose each of the lamps. The bottom of each such chamber has an opening, as illustrated, through which each pair of lamp lead-in wires pass through to their electrical connection areas on the circuit board. In this manner, as is best illustrated in FIG. 2, the housing web 31c encloses the lamp lead-in wires and contact areas on the circuit board to which the wires are connected.

As described in a copending application Ser. No. 181,938, filed concurrently herewith and assigned to the present assignee, the folded-over front housing portion 31 is securely attached to the back portion 32 in the following manner in order to provide improved structural closure strength. Referring to FIGS. 1–4, a pair of symmetrically disposed wire staples 50 are inserted through respectively aligned preformed holes 52 in the bottom tabs, 32c and 31b and the circuit board 16. Preferably, the staples are inserted from the back side of the housing and crimped over, or clinched, onto the front side of the housing. More specifically, each of the staples has a pair of legs 50a and 50b which extend through the aligned holes 52 in the housing tabs and circuit board. Each staple further includes a center region 50c which is positioned to bear against the external surface of the back portion tab 32c. The staple legs 50a and 50b are clinched onto the external surface of the front portion tab 31b so as to secure the symmetrically disposed staples at the bottom peripheral areas of the housing. In this manner, the housing tabs 32c and 31b are firmly secured together with the printed circuit board sandwiched and secured therebetween. In the embodiment illustrated, the staple legs 50a and 50b are shown bent inwardly toward each other, and the symmetrically disposed staples are oriented to be substantially lengthwise parallel with the bottom periphery of the front portion tab 31b of the folded-over housing member. Preferably, the clinched legs of each of the staples are flattened to be adjacently parallel to the surface onto which the legs are clinched, thereby providing a neater, less obtrusive appearance. In order to avoid any possible interference with the operating circuitry on the circuit board, the holes 52 in the circuit board, and thus the staple legs extending therethrough, are spaced away from the conductive circuit patterns 11a', 12a', etc., as illustrated in FIGS. 1 and 4.

In order to provide complete securing of the housing enclosure, the sides of the housing may also be sealed together by use of adhesive. More specifically, the back housing side flanges 32a and 32b align with the side portions of the front window area 31a such that an adhesive or other securing means may be disposed therebetween. As illustrated, the side flanges 32a and 32b may extend from the top to the bottom of the back portion of the unit, following the offset between the front periphery of the cavities and tab 32c, and thereby align with each full side of the front portion of the housing. That is, flanges 32a and 32b align with respective sides of the window area 31a, the web 31c, and the tab 31b.

In order to facilitate engagement of the terminal areas 20–25 with the socket contacts of a source of lamp firing pulses, such as a camera or flash attachment, the projecting tab 16a of the circuit board extends below and exteriorly of the secured housing enclosure, as shown in FIGS. 1 and 2, to expose these terminal areas.

The surfaces of the lamp-receiving cavities 11'–15' which face the lamps are provided with a coating 34 of reflective material. Typically, the reflector coating is provided by selectively aluminizing the housing cavities. In this manner, a reflective aluminum coating is disposed on the lamp-facing surfaces of the cavities, with the front portion 31 of the housing and the secured regions 32a, 32b and 32c along the sides and bottom of the back portion of the housing being free of the aluminum coating, as shown in FIG. 4.

In accordance with the present invention, a label 70 comprising an adhesive-backed sheet of substantially opaque material, such as color-printed paper, is affixed to the exterior of the housing 30 and disposed to cover a section of the light-transmitting front portion 31 of the housing for providing selective shielding of the light radiated during the flashing of any of the lamps 11–15. More specifically, in the absence of such a label, light radiated from a flashing lamp would be transmitted in a downward direction through the transparent web 31c. Light rays permitted to pass in this downward direction could cause a problem of interference with the photocell operation in certain types of cameras, such as described, for example, in U.S. Pat. Nos. 4,017,873 and 4,023,187. According to the present invention, therefore, the label 70 is extended to cover substantially the entire exterior surface of web 31c so as to shield the downwardly radiated light to prevent interference with camera photocell operation. Further, to enhance the usable light available upon the flashing of a lamp in such a compact photoflash unit, the side of the label 70 affixed to the housing web 31c, and thereby facing the lamps, can be provided with a reflective surface 72 (FIG. 2). In this manner, when a lamp is flashed, the radiated light striking the label-shield 70 is redirected by the reflective surface 72 toward the reflective coating 34 behind the lamps for subsequent redirection through the window area 31a as usable light.

Further yet, as illustrated in the drawings, the label 70 is extended to cover the bottom peripheral edge of the front portion of the housing, namely, tab 31b, so as to thereby cover the clinched staple legs 50a and 50b. In this manner, the asthetic appearance of the front of the photoflash unit is enhanced, and the ends of the staples are covered to isolate them from contact with a hand of a person holding the array. Further improvements in appearance and protection can be provided by employing a label with a layer of indentable padding 70a (FIG. 2) so that the portions of the label covering the clinched staple legs have a substantially smooth external surface. For example, the padded label may comprise an adhesive backed sheet of comparatively heavy carboard. On the other hand, the padding may be provided by a thin layer of plastic or rubber foam disposed between a printed paper layer and the adhesive layer.

In addition to the above-described functional purposes, of course, the label may be appropriately colored and contain indicia 74 for purposes of enhancing appearance and providing identification and/or instructions or indications.

The flash actuating circuitry functions as follows upon the terminals 20–25 being connected to a source of firing pulses, such as, for example, described in the aforementioned U.S. Pat. Nos. 3,618,492 and 3,757,643. Assuming that none of the lamps have been flashed, upon occurrence of a first firing pulse across terminals 20 and 21, this pulse will be directly applied to the lead-in wires of the first connected flashlamp 11, whereupon the lamp 11 flashes and becomes an open circuit between its lead-in wires 11a and 11b. In the electronic circuit described in the aforementioned U.S. Pat. No. 3,618,492, a monitoring function is provided wherein a current of limited predetermined maximum value is applied through each unexpended flashlamp. This monitoring current is generated prior to the ignition of a given one of the flashlamps. In this manner, alignment signals are derived which function to align the flashlamp sequencing circuit to bypass inoperative flashlamps. This monitoring function is dependent upon the resistance across the lamp lead-in wires. Thus, if the monitoring circuit senses a significantly higher resistance across the lamp lead-in wires, say for example, higher than 50 ohms, the selective terminal connected to that lamp will be bypassed, and the firing pulse will be applied across the operative lamp connected to the next successive selective terminal. On the other hand, if the monitoring circuit senses a resistance below the preselected level (that is below about 50 ohms) a firing pulse will be applied to the selective terminal connected to that lamp.

In the present instance, with the first lamp 11 having been fired, the monitoring circuit will cause the firing pulse alignment to bypass terminal 21 and proceed to terminal 22, to which the unexpended lamp 12 is directly connected. Hence, when the next firing pulse occurs, it is applied directly to the second lamp 12, thereby firing that lamp. In like manner the third firing pulse is applied via terminals 20 and 23 to fire lamp 13. The fourth firing pulse is applied via terminals 20 and 24 to fire lamp 14 and the fifth firing pulse applied via terminals 20 and 25 to fire lamp 15. As each lamp flashes, the reflective metalized coating 34 causes the flash illumination to be directed in front of the array.

Although the described embodiments have referred to the use of five lamps in a horizontal linear array which is unidirectional and employs a relatively narrow connecting tab, it is contemplated that the construction may be applied to an array of two or more lamps which may be disposed for bidirectional applications in an arrangement that is other than linear and employs a connecting tab which is as wide as or wider than the printed circuit board. Thus, for example, FIG. 5 illustrates a specific alternative embodiment which employs ten lamps 40 disposed in a horizontal linear array in a one-piece housing having a front portion 43 and a back portion 45 with reflector cavities 44 facing unidirectionally. Other than for employing ten cavities and having somewhat different overall dimensions, the housing 42 is essentially the same as the housing 30 described with respect to FIGS. 1-4. The photoflash unit of FIG. 5 employs a printed circuit board having a projecting tab 46 which is actually wider than the main portion of the circuit board. The circuit board is sandwiched between tabs 43b and 45a along the bottom peripheries of the folded-over front and back housing portions, respectively. Disposed on the circuit board tab 46 are a plurality of conductive terminal areas 48 which extend below and exteriorly of the secured housing enclosure. If, as illustrated, five selective terminals and a common terminal are employed to control the firing of ten lamps, selective switching circuitry may be employed for respective lamp pairs, as described in copending application Ser. Nos. 156,983 and 156,991, both filed June 6, 1980 and assigned to the present assignee. The lamps are assembled to the circuit board, and the circuit board is enclosed and secured within the housing 42, in the same manner described with respect to the embodiment of FIGS. 1-4. In this instance, however, four staples 60 (only the legs 60a and 60b are visible) are symmetrically disposed along the bottom periphery of the housing, with the respective center regions (not visible) bearing against the exterior surface of back tab 45a, and with each pair of staple legs 60a, 60b extending through tabs 43b and 45a and the circuit board and being clinched flat against the exterior surface of front tab 43b. Again, the four staples are arranged lengthwise parallel with the bottom periphery of tab 43b, thereby providing a neat, secure attachment along the bottom of this much wider folded-over housing configuration in combination with a wider circuit board tab. In like manner to the label 70 of FIGS. 1-4, the photoflash unit of FIG. 5 includes an adhesive-backed label 80 which is affixed to the exterior of the front portion of the array housing so as to cover tab 43b and a web 43c. In this manner, the clinched ends of the staple legs 60a and 60b are covered, and the desired shielding of downwardly directed light is provided at the lower periphery of the array. Again, the size of the label affixed to web 43c can be provided with a reflective surface 82 so as to redirect the shielded light toward the reflective surfaces behind the lamps for subsequent redirection through a window area 43a as usable light. The label can also include indicia 84 for enhancing appearance and providing identification.

Although the invention has been described with respect to a specific embodiment, it will be appreciated that modifications and changes may be made by those skilled in the art without departing from the true spirit and scope of the invention. For example, the housing 30 may be formed of materials other than cellulose propionate, such as other thermoplastic films; the circuit board may be formed of a material other than phenolic, such as enamel coated steel or polystyrene, and may be an integral part of the the housing; and conductive materials other than copper may be employed for providing the circuit patterns. Of course, if the circuitry is integral with the housing, such as, for example, by disposing the conductive circuit patterns directly on tab 32c of the back housing portion, then the staple would extend through only the two bottom housing tabs and be spaced apart from the conductor runs. It is also clear, that the staple legs may be bent outwardly away from each other, rather than inward; and one or more staples may be employed. The label 70 or 80 must be of a material that is substantially opaque to light transmission so as to effectively shield the radiated light; hence, the label material cannot be transparent or highly translucent, but it can be reflective.

We claim:

1. A multilamp photoflash unit comprising, in combination, a housing means having a light-transmitting front portion, a plurality of flashlamps enclosed in said housing means, terminal means joined to said housing means and coupled to said lamps for enabling flashing of the lamps in response to flash actuation signals applied to said terminal means, and a label comprising an adhesive backed sheet of substantially opaque material affixed to the exterior of said housing means and disposed to cover a section of said light-transmitting front portion of the housing means for providing selective shielding of the light radiated from said flashing lamps.

2. The photoflash unit of claim 1 wherein said housing means further includes reflective surfaces behind said lamps, and the side of said label affixed to said section of the front portion of said housing means and thereby facing said lamps has a reflective surface, whereby the shielded light is redirected toward said reflective surfaces behind the lamps for subsequent redirection as usable light.

3. The photoflash unit of claim 1 further including means securing said front portion to a remainder portion of said housing means at peripheral areas thereof comprising one or more staples, each of said staples having a pair of legs extending through both of said housing portions and having a center region bearing against a surface of said remainder portion, said legs being clinched onto an external surface of said front portion, and wherein said label afixed to said housing means also covers said peripheral areas of said front portion and said clinched staple legs thereat.

4. The photoflash unit of claim 3 wherein said label includes a layer of indentable padding, whereby the portions of said label covering said clinched staple legs have a substantially smooth external surface.

5. The photoflash unit of claim 1 wherein said housing means comprises a one-piece housing member having a light-transmitting front portion folded over a back portion containing a plurality of lamp-receiving cavities in a horizontal linear array, each of said plurality of flashlamps are disposed on a respective one of said cavities and enclosed by said folded-over housing member, said housing member contains a linear fold separating said front and back portions and disposed horizontally along the top of said housing member, and said label affixed to said housing means is disposed along the bottom of said folded-over front portion of the housing member.

6. The photoflash unit of claim 5 further including means securing said front portion to said back portion along the bottom of said folded over housing member and thereby providing a secured enclosure about said lamps, said securing means comprising one or more staples each having a pair of legs extending through both of said housing portions and each having a center region bearing against an external surface of said back portion, said legs being clinched onto an external surface of said front portion, and wherein said label affixed to said housing means along the bottom thereof functions to both cover said clinched staple legs thereat and provide selective shielding of light radiated from said flashing lamps.

7. The photoflash unit of claim 6 wherein said label includes a layer of indentable padding, whereby the portions of said label covering said clinched staple legs have a substantially smooth external surface.

8. The photoflash unit of claim 6 wherein each of said pairs of staple legs extend through the region of said terminal means, each of said lamps has a pair of lead-in wires secured in electrical connection with respective portions of said terminal means within said secured enclosure, and said terminal means extends below and exteriorly of said secured enclosure.

9. The photoflash unit of claim 8 wherein said terminal means comprises a printed circuit board having electrically conductive circuit patterns disposed on a surface thereof, said circuit patterns including a plurality of terminal areas at one side edge of said circuit board that are selectively interconnected with a plurality of lamp contact areas, each of said lamps has a pair of lead-in wires secured in electrical connection with respective ones of said lamp contact areas, said side edge of the circuit board having said terminal areas extending below said folded-over housing member, and each of said pairs of staple legs extend through said printed circuit board.

10. The photoflash unit of claim 5 wherein said terinal means comprises a printed circuit board having electrically conductive circuit patterns disposed on a surface thereof, said circuit patterns including a plurality of terminal areas at one side edge of said circuit board that are selectively interconnected with a plurality of lamp contact areas, each of said lamps has a pair of lead-in wires secured in electrical connection with respective ones of said lamp contact areas, said side edge of the circuit board having said terminal areas extends below said folded-over housing member, said back portion of the housing member includes a first tab means extending below said cavities, said front portion of the housing member includes a window area adjacent said lamps and a second tab means extending below said window area, said label is disposed to cover a section of said window area along the bottom thereof, said circuit board has a projecting tab at said one side edge with said terminal areas located adjacent one another on said circuit board tab, and further including respective means securing said front portion to said back portion along the bottom of said folded over housing member, thereby providing a secured enclosure about said lamp, a portion of said circuit board being sandwiched between and secured to said first and second tab means of the housing member with said circuit board tab extending below and exteriorly of said secured enclosure.

11. The photoflash unit of claim 10 wherein a coating of reflective material is disposed on the surfaces of said lamp-receiving cavities which face said lamps, and the side of said label affixed to cover a section of said window area has a reflective surface, whereby the shielded light is redirected toward said reflective surfaces of said lamp-receiving cavities for subsequent redirection as usable light.

12. The photoflash unit of claim 10 wherein said lamp lead-in wires and lamp contact areas are disposed within said secured enclosure, said second tab means and the uncovered section of said window area of the front portion of the housing member are disposed in substantially parallel planes offset from one another, said front portion further includes a web joining said uncovered section of said window area and said second tab means, said web enclosing said lead-in wires, and said label is disposed to cover substantially the entire exterior surface of said web.

13. The photoflash unit of claim 12 wherein said securing means comprises one or more staples disposed along the first and second tab means of said folded-over housing member, each of said staples having a pair of legs extending through said first and second tab means and said circuit board sandwiched therebetween, each staple further including a center region bearing against an external surface of said first tab means of the housing, said staple legs being clinched onto an external surface of said second tab means of the housing, and said label affixed to said housing means also covers the exterior surface of said second tab means of the housing and said clinched staple legs thereat.

14. The photoflash unit of claim 13 wherein said label includes a layer of indentable padding, whereby the portions of said label covering said clinched staple legs have a substantially smooth external surface.

15. The photoflash unit of claim 13 wherein a coating of reflective material is disposed on the surfaces of said lamp-receiving cavities which face said lamps, and the side of said label affixed to cover said web has a reflective surface, whereby the shielded light is redirected toward said reflective surface of said lamp-receiving cavities for subsequent redirection as usable light.

* * * * *

UNITED STATES PATENT AND TRADEMARK OFFICE
CERTIFICATE OF CORRECTION

PATENT NO. : 4,325,104
DATED : April 13, 1982
INVENTOR(S) : DAVID R. BROADT; EMERY G. AUDESSE It is certified that error appears in the above-identified patent and that said Letters Patent are hereby corrected as shown below:

Column 10, Line 31 delete "afixed" and insert (-affixed-)
Column 11, Line 21 delete "terinal" and insert (-terminal-)

Signed and Sealed this

Twenty-third Day of November 1982

[SEAL]

Attest:

GERALD J. MOSSINGHOFF

Attesting Officer   Commissioner of Patents and Trademarks